US 9,177,398 B2

(12) United States Patent
Bierweiler et al.

(10) Patent No.: US 9,177,398 B2
(45) Date of Patent: Nov. 3, 2015

(54) METHOD AND DEVICE FOR SUPPORTING FAULT DIAGNOSIS OF AN INDUSTRIAL INSTALLATION

(75) Inventors: Thomas Bierweiler, Stutensee (DE); Annika Simmel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 13/604,435

(22) Filed: Sep. 5, 2012

(65) Prior Publication Data
US 2013/0235041 A1   Sep. 12, 2013

(30) Foreign Application Priority Data

Sep. 6, 2011   (EP) .................................... 11180247

(51) Int. Cl.
*G06T 11/20* (2006.01)
*G05B 23/02* (2006.01)

(52) U.S. Cl.
CPC ............ *G06T 11/20* (2013.01); *G05B 23/0251* (2013.01)

(58) Field of Classification Search
CPC ... G05B 23/0251; G06T 11/20; G06T 11/206
USPC ........................................................ 345/440
See application file for complete search history.

(56) References Cited

U.S. PATENT DOCUMENTS

| 5,999,894 | A | * | 12/1999 | Mederer et al. ................ 702/182 |
| 2004/0133289 | A1 | | 7/2004 | Larsson et al. |
| 2005/0246112 | A1 | * | 11/2005 | Abhulimen et al. ............ 702/51 |
| 2012/0131388 | A1 | | 5/2012 | Snooke |

FOREIGN PATENT DOCUMENTS

| CN | 1159233 | 9/1997 |
| EP | 1377950 | 1/2004 |
| EP | 2 043 033 | 4/2009 |

(Continued)

OTHER PUBLICATIONS

On-line fault diagnosis using the signed directed graph Chung Chien Chang and Cheng Ching Yu Industrial & Engineering Chemistry Research 1990 29 (7), 1290-1299.*

(Continued)

*Primary Examiner* — Stephen R Koziol
*Assistant Examiner* — Shivang Patel
(74) *Attorney, Agent, or Firm* — Cozen O'Connor

(57) ABSTRACT

For supporting fault diagnosis of an industrial installation having a plurality of installation components connected via a pipeline system, provision is made for assigning each installation component to one of a plurality of abstract component types, where a weighted directed component graph is in turn assigned to each component type. A piping and instrumentation flow diagram of the industrial installation is processed component by component proceeding from a start point along a pipeline system. Here, in the case of each installation component, the component graph of the installation component assigned according to the component type is accessed. The individual component graphs are joined together to form a system of weighted directed overall graphs of the industrial installation, the nodes of which are each assigned to a plurality of individual installation components.

18 Claims, 11 Drawing Sheets

(56) References Cited

FOREIGN PATENT DOCUMENTS

| WO | WO 2007/011081 | 1/2007 |
| WO | WO 2010/142977 | 12/2010 |

OTHER PUBLICATIONS

Automatic construction of extended symptom-fault associations from the signed digraph Dong Soo Nama, Chonghun Han, Chang Wook Jeonga, En Sup Yoon European Symposium on Computer Aided Process Engineering, vol. 20, Supplement 1, 1996, pp. S605-S610.*

A signed directed graph-based systematic framework for steady-state malfunction diagnosis inside control loops, Mano Ram Mauryaa, Raghunathan Rengaswamy, Venkat Venkatasubramanian. Chemical Engineering Science vol. 61, Issue 6, Mar. 2006, pp. 1790-1810.*

D.S. Nam et al.: "Automatic Construction of Extended Symptom-Fault Associations from the signed Digraph", Computers & Chemical Engineering, 20, 605-610, 1996.

* cited by examiner

METHOD AND DEVICE FOR SUPPORTING FAULT DIAGNOSIS OF AN INDUSTRIAL INSTALLATION

BACKGROUND OF THE INVENTION

1. Field of the Invention

The invention relates to a method for supporting the fault diagnosis of an industrial installation, and an associated device.

2. Description of the Related Art

Here and hereinafter the term industrial installation relates, in particular, to a process engineering or industrial engineering installation from the field of the chemical industry, beverage and food engineering, environmental technology, pharmaceutical industry or gas and oil industry.

An (industrial) installation of this type generally comprises a multiplicity of individual installation components interconnected with one another. In this case, typical installation components of an industrial or process engineering installation are containers, reactors, pipelines, fittings, etc. In the course of a production process, starting materials, i.e., fluids, pass through the components, with the starting materials being changed/processed to form a resultant product.

Process or operating parameters are usually assigned to the individual installation components. In this case, such a process parameter describes a state of the respective installation component, or of the fluid to be processed in the installation component, which is normally variable in the course of the process. Such process parameters are, firstly, in particular, a temperature, a pressure, a flow rate or a mass flow of the fluid that corresponds thereto. Secondly, however, such an operating parameter can also describe a setting associated with the respective installation component, for example, a valve position ("open", "closed", "partly closed") or a pump capacity or an assigned rotation speed.

Hereinafter, the abovementioned process parameters are differentiated into two groups, i.e., into observable (metrologically detected) process parameters and those which are not observable.

Observable process parameters are usually represented (at least partly) on a control diagram in a control or process control room of the industrial installation. In this case, the control diagram often shows a schematic, usually a simplified flow diagram of the installation. In this case, the control diagram comprises a plurality of "control objects", where each control object is respectively assigned to an installation component. In this case, a control object serves to represent current operating data (i.e., actual, setpoint and actuating values of an observable process parameter) of the installation component. If a fault occurs during the operation of the installation, as a result of which a process parameter deviates from a predefined setpoint value by more than a specific alarm threshold, then an alarm is usually output (graphically) by the control object.

However, it is often very difficult and correspondingly time-consuming to find, and thus to be able to rectify, a fault cause based on such an alarm, on account of the usually very high complexity of the installation and the incompleteness of such a control diagram. However, a fault cause that is identified too late can result in production losses, for which reason early identification of a fault cause is desirable.

SUMMARY OF THE INVENTION

It is therefore an object of the invention to provide a method for facilitating the fault diagnosis of an industrial installation.

This and other objects and advantages are achieved in accordance with the invention by a method for supporting the fault diagnosis of an industrial installation having a plurality of installation components connected via a pipeline system. In the context of the method in accordance with the invention, provision is made in this case for creating a system of directed weighted graphs for the installation. In order to create this system of graphs, each installation component is assigned to one of a plurality of predefined, abstract component types. A piping and instrumentation flow diagram of the industrial installation is processed component by component in the course of the method proceeding from a selected start point along its pipelines. In this case, each time a component is reached, a component graph is accessed, which is assigned to the component according to the component type (i.e., in accordance with the component type). For each specific component, therefore, that component graph which is stored for the component type to which the component was assigned is selected. Finally, the individual component graphs are joined together to form a system of weighted directed (overall) graphs of the industrial installation, where each of the nodes thereof is assigned to a plurality of individual installation components or the associated process parameters thereof.

The term "graph" hereinafter denotes, within the meaning of graph theory, a representation which represents the individual process parameters of the installation components and connections and interactions that exist between the individual process parameters of the installation components. Here, a "node" is assigned to each installation component or to each process parameter. Hereinafter, the connections between the individual nodes are designated as "edges". The edges are "directed" insofar as they indicate an effective direction of an assigned interaction from an independent process parameter to a process parameter dependent thereon. The directed edges are represented in the graph by arrows pointing in the effective direction.

"Weighted" graphs are always considered in the context of the invention. In this case, a value is assigned to each edge.

In one preferred embodiment of the invention, for this purpose a "state" is assigned to each process parameter, wherein said state is regarded as "0" or "normal" if the assigned process parameter lies in a validity range predefined for the process parameter. If a process parameter deviates from the validity range, it is no longer in the normal state. The process parameter is then assigned, for example, a "positive state" or "+" if it lies above an upper limit of the validity range, or a "negative state" or "−" if it lies below a lower limit of the validity range.

If such a deviation of the process parameter considered entails a deviation in the same sense in the case of a dependent process parameter, then in the embodiment described above an edge directed from this process parameter node to the node of the dependent process parameter is weighted positively ("+1"). A deviation is regarded as in the same sense in this case when the abovementioned states of the two process parameters have the same sign. Accordingly, in the case of an inverse change, i.e., if both states have different signs, an edge is weighted negatively ("−1").

In addition, provision is preferably made for considering the strength of the deviation of the respective process parameter from its validity range. In this case, a deviation is regarded as "strong" if the deviation of the associated process parameter cannot be corrected by a control loop possibly present, while a "weak" deviation can be corrected by a control loop. In this case, it is preferably provided that a process parameter is assigned a state "+10" or "−10" in the case of a strong positive or negative deviation, respectively.

Moreover, an edge is weighted with "+10" or "−10" if the associated dependent process parameter changes strongly in the same sense or inversely. However, further gradations are likewise possible in this case.

In the context of the method in accordance with the invention, the term "component type" denotes a generic installation component that is specified according to the type of component and which has a typical mode of action with regard to the installation or other installation components. Exemplary component types of a typical installation are, in particular, "valve", "container" (also designated as "supply tank"), "pipeline section", "pump", "flow meter" or "pressure sensor".

The component graphs used in accordance with the method of the invention are assigned in pairs to the component types provided. Therefore, an associated component graph is stored for each component type. In a preferred embodiment of the method, each component graph comprises at least one first node assigned to a process parameter of the installation component, and at least one further node assigned to a process parameter dependent on the process parameter considered. Moreover, the component graph comprises at least one directed weighted edge from the first node to the further node. For a component type considered, in this case the component graph describes in a general form the interactions of the assigned installation component or the associated process parameter thereof or the associated process parameters thereof with other installation components or process parameters.

For better delimitation from these component graphs, which always describe only an individual installation component, at least one graph—to be created in accordance with disclosed embodiments of the method—of the overall installation or of an installation part containing a plurality of components is also designated as an "overall graph". In the case of a simple installation, the system of overall graphs can consist of a single overall graph. In the case of more complex installations, however, the system generally consists of a plurality of overall graphs, each of which is assigned to a part of the installation, i.e., to a subsystem or an operating state group. The terms "subsystem" and "operating state group" are explained in greater detail below.

Preferably, a container or a pipeline branching is always chosen as the start point for the component by component processing of the piping and instrumentation flow diagram of the specific installation that is used for the method in accordance with disclosed embodiments of the invention. Preferably, the pipelines are processed in the flow direction of a fluid to be processed in the installation.

During the processing of the piping and instrumentation flow diagram, the individual component graphs serve virtually as models (or—in the nomenclature of object-oriented programming—classes) which can be instantiated as often as desired, i.e., which can be accessed as often as desired.

A graph of the overall installation or of an installation part created in the course of the method in accordance with disclosed embodiments of the invention can then advantageously be utilized for fault cause analysis because the graph shows fault relationships within the installation.

With the aid of the method in accordance with disclosed embodiments, it is advantageously possible to create the associated graph systematically even in the case of a very complex industrial installation. This makes it possible, in particular, to create the at least one overall graph of the specific installation in an automated manner from the stored component graphs. A piping and instrumentation flow diagram is normally available for each industrial installation, in particular even already in the planning phase thereof. Accordingly, the above described embodiments of the method can advantageously be applied to virtually any arbitrary industrial installation.

The creation in accordance with disclosed embodiments of the method of the at least one overall graph simplifies the fault cause analysis, i.e., in cases in which there is no or little experience to go on concerning the behavior of a specific installation during the operation thereof. Therefore, it can be used particularly advantageously in the context of proactively finding and avoiding faults in the planning phase of the installation.

In one preferred embodiment of the method, both the at least one overall graph and the component graphs are each represented in the form of an adjacency matrix. The respective adjacency matrix represents the associated graph by virtue of the fact that a node is assigned to each column or respectively to each row and by virtue of the fact that the individual elements of the matrix respectively correspond to a directed edge from the node represented in the assigned row to a node represented by the assigned column. Here, the entry itself as a numerical value reproduces the weighting of the relevant edge.

In order to define the process parameters associated with a respective adjacency matrix, in this case a process parameter vector is assigned to each adjacency matrix. The vector comprises as vector elements all process parameters that occur as nodes in the associated graph. Here, the order of the vector elements is transferred to the order of the column or respectively row entries of the matrix. That is, an element in the i-th row and the j-th column of the adjacency matrix corresponds to an edge from the i-th vector element (process parameter) to the j-th vector element (process parameter) of the process parameter vector.

In order to create the overall adjacency matrix of the at least one overall graph of the installation, provision is preferably made for firstly predefining each component graph in the form of the assigned non-specific component adjacency matrix. Here, non-specific means that in the associated process parameter vector the individual process parameters are presented in a general form that is not instantiated (i.e., concretely specified).

In accordance with disclosed embodiments of the method, preferably all the installation components of the specific installation are firstly uniquely designated, i.e., numbered, and thus specified based on the piping and instrumentation flow diagram. A process parameter vector of the overall installation or of an installation part is thus formed.

In accordance with the number of considered process parameters of the installation, in an embodiment of the method of the invention, an (initially empty, i.e., value-undetermined) overall adjacency matrix is furthermore created for the at least one overall graph. This initially empty overall adjacency matrix is then "filled" component by component. In this case, proceeding from the chosen start point, the associated component adjacency matrix and the associated process parameter vector are determined and specified (or instantiated) for each specific installation component along the processing path by virtue of the fact that the undetermined process parameters of the component type on which the component adjacency matrix is based are replaced by the specific process parameters of the specific installation object. By way of example, the inlet pressure (generally designated as "Pi") of the component type "pipeline section", in the course of the specifying, is replaced by the specific inlet pressure "Pi_R01215" of a specific pipeline section "R01215". The entries of the component adjacency matrix are subsequently transferred into the overall adjacency matrix in accordance with the specified process parameters. Here, installation components of the industrial installation are accessed along the pipelines progressively until an entry has been made in the overall adjacency matrix for all the installation components.

An embodiment of the method which is particularly advantageous for an automation of the method provides for the piping and instrumentation flow diagram of the installation to be stored in a database, i.e., in an XML format ("Extensible Markup Language"). Likewise, the component adjacency matrices, once again in particular in an XML format, are also stored in the same or a different database.

In a further embodiment of the method, the at least one overall graph of the installation, after it has been created, is extended by additional fault cause nodes having no counterpart in physical installation components. The effects of typical fault causes, such as blockages, leaks, malfunctions of sensors or pumps, on one or more process parameters of the industrial installation are stored in such fault cause nodes. Accordingly, each fault cause node contains a directed weighted edge to a node or a plurality of nodes of the at least one overall graph that corresponds to a physical installation component. The overall graph with added fault cause nodes is designated hereinafter as "diagnosis graph".

In a preferred embodiment, each fault cause node is assigned one of a plurality of stored fault cause types, where an assigned fault cause adjacency matrix, i.e., in an XML format, is in turn stored for each fault cause type. Fault cause nodes are in this respect treated just like nodes that are assigned to physical installation components.

Preferably, in the case of an ascertained deviation of an observable process parameter of one of the installation components from a normal state, the overall or diagnosis graph is evaluated with the aid of the ESFA ("Extended Symptom-Fault Association") method for determining possible fault causes, as is described, for example, in D. S. Nam et al.: "Automatic Construction of Extended Symptom-Fault Associations from the signed Digraph", Computers & Chemical Engineering, 20, 605-610, 1996.

Preferably, the possible fault causes thus determined are graphically displayed, for example, on a separate display region of a control diagram of the industrial installation.

An observable deviation is preferably identified with the aid of historical data about the behavior of the installation, i.e., by SOM ("self organizing maps"). Additionally or alternatively, a deviation can be identified with the aid of fixedly predefined alarm thresholds stored for each observable process parameter.

In order to keep the system of the overall graphs as clear as possible in the case of a complex installation, one preferred embodiment of the method provides for firstly subdividing the piping and instrumentation flow diagram into individual subsystems, where the subsystems can optionally overlap. In this case, the term subsystem denotes a group of installation components that are in turn connected to one another by a pipeline system comprising a number of pipeline sections. Therefore, a subsystem graph is created for each subsystem. The individual subsystem graphs can optionally form the method result as a system of individual overall graphs or can be combined to form a comprehensive overall graph of a larger installation part or of the overall installation.

Expediently, in this case the individual subsystems are chosen such that the associated installation components only influence process parameters of the dedicated subsystem and do not interact with installation components or the process parameters thereof of another subsystem. Here, it has proved to be expedient to choose in each case a container as a boundary component for delimiting two subsystems from one another.

In a further embodiment, which is advantageous with regard to simple implementation, the piping and instrumentation flow diagram is subdivided into individual operating state groups. Here, an operating state group comprises those installation components and the respectively interposed pipeline sections that are used in a specific operating state. In this case, the term operating state denotes a specific mode of operation or mode of driving of the installation that can be distinguished from at least one further mode of operation or mode of driving. In this case, for each operating state an associated operating state graph is created, which correspondingly comprises as nodes only the process parameters involved in the respective operating state. In addition, different operating states can differ, i.e., in each of the operating states a different subgroup of the installation components is in operation, while the other installation components in each case are not in operation. The installation components that are in an operating state in operation can therefore be regarded as a unit forming a partial installation. Here, an operating state group can consist of one or more of the above-described subsystems. In this case, the corresponding subsystem graphs can optionally be combined to form an operating state graph of the respectively associated operating state group. In this case, the operating state graphs form the method result as a system of overall graphs.

The operative relationships of pumps and valves when present simultaneously in an industrial installation are not unambiguous. As a result, it has been found to be advantageous in this case to perform two passes through the piping and instrumentation flow diagram for the purpose of creating two overall graphs. In the first pass, all components with the exception of the pumps are processed, where a first overall graph (hereinafter: "valve overall graph") is created. In the second sequential pass through the piping and instrumentation flow diagram, all components with the exception of the valves are processed, where a second overall graph (hereinafter: "pump overall graph") of the installation is created. Here, the terms "first" and "second" pass should not be understood in the sense of a mandatory temporal order. In particular, the "pump overall graph", in the context of disclosed embodiments of invention, can also be created temporally before or simultaneously with (i.e., in parallel with) the "valve overall graph". In the case of a complex installation having a plurality of operating state groups each formed from a plurality of subsystems, therefore, the system of overall graphs can comprise, in particular, a pump overall graph and a valve overall graph for each operating state group or even for each subsystem of each operating state group.

Control loops present in the installation often make it difficult to identify and analyze faults, because deviations of process parameters that would be symptomatic of the fault are corrected. In one advantageous embodiment of the method in accordance with the invention, therefore, a hypothetical value of a process parameter controlled by a manipulated variable before the intervention of the closed-loop control is determined by computationally compensating for the effect of the closed-loop control. This is done by virtue of the fact that, proceeding from an actual (observed) value of the manipulated variable and an actual value of the controlled process parameter, taking account of the mode of operation of the closed-loop control, the value of the process parameter before the intervention of the closed-loop control is deduced.

It is also an object of the invention to provide a device for supporting the fault diagnosis of an industrial installation.

The device in accordance with the invention comprises a database, in which the piping and instrumentation flow diagram of the installation and component graphs or the component adjacency matrices corresponding thereto are stored. Moreover, the device comprises a creation module, which is configured to create a system of overall graphs of the installation according to the above-described method in accordance with disclosed embodiments of the invention. Preferably, the device additionally comprises a diagnosis unit, which is configured to evaluate a diagnosis graph produced from the at least one overall graph of the installation for the purpose of finding fault causes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in greater detail below with reference to drawings, in which.

DETAILED DESCRIPTION OF THE PREFERRED EMBODIMENTS

Mutually corresponding parts and variables are always provided with the same reference signs in all the figures.

Figure 1:
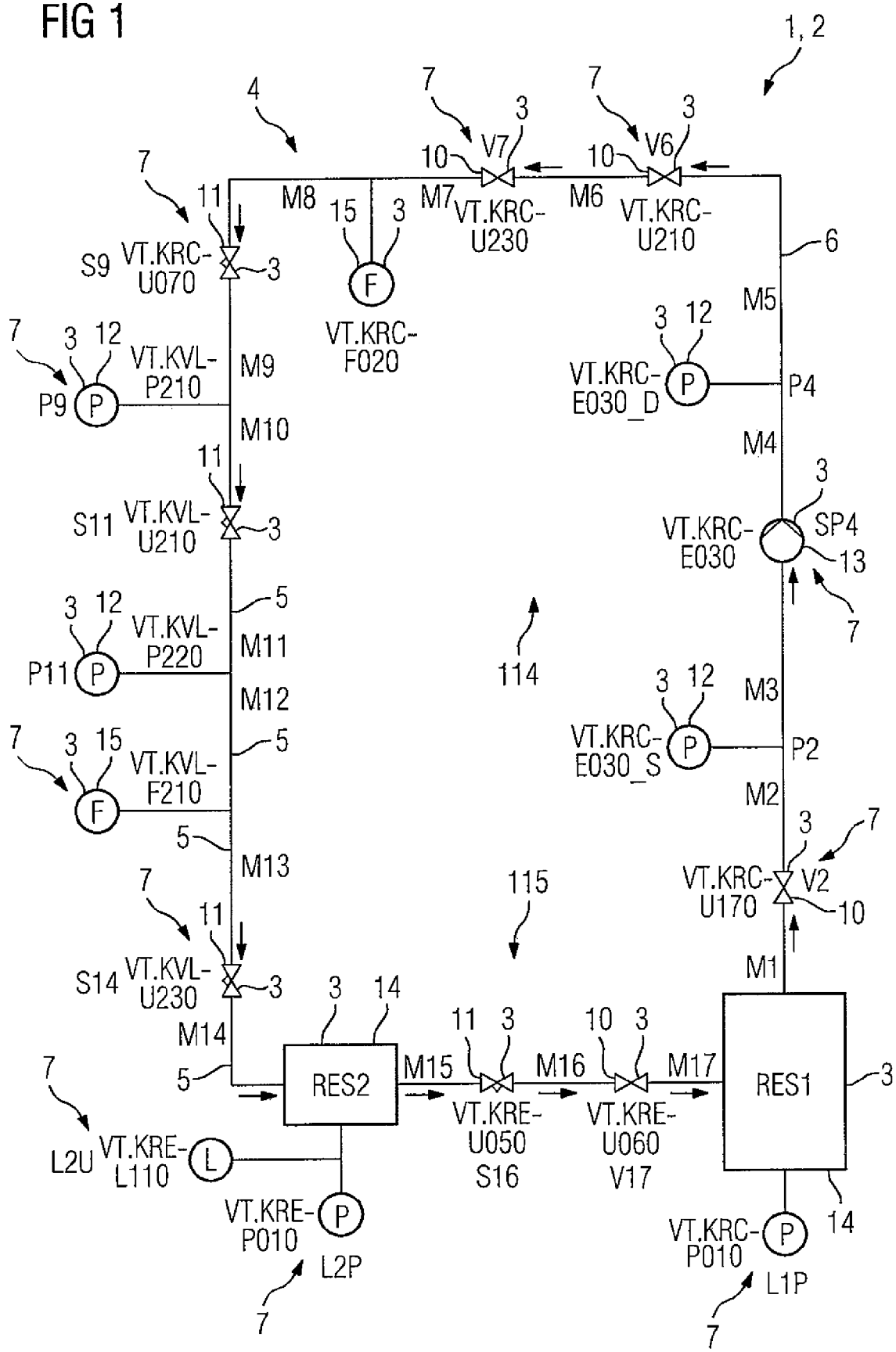
FIG. 1 is a schematic block diagram illustrating a first piping and instrumentation flow diagram of an (industrial) installation comprising a multiplicity of installation components which are connected to one another via a pipeline system in accordance with the invention.

FIG. 1 shows a first piping and instrumentation flow diagram 1, which represents a first (industrial) installation 2.

The flow diagram 1 comprises symbols for a multiplicity of (installation) components 3 of which the installation 2 is composed. The flow diagram 1 furthermore comprises connecting lines symbolizing a pipeline system 4 of the installation 2, via which system the components 3 are interconnected with one another.

According to the flow diagram 1, the pipeline system 4 comprises a multiplicity of pipeline sections 5, where each pipeline section 5 always connects two installation components 3.

Consequently, the flow diagram 1 establishes which installation components 3 in the installation 2 are interconnected with one another and the pipeline engineering arrangement in which this is accomplished. The flow diagram 1 additionally stipulates by arrows the flow direction 6 in which the individual components are connected to one another.

Both the installation components 3 and the pipeline sections 5 are each assigned one or more process parameters 7 describing flow mechanical properties (i.e., pressures or mass flow rates) of a fluid to be processed in the installation.

Each of the individual installation components 3 each corresponds to an abstract "component type" characterizing the type of the specific installation component and the respectively assigned abstract process parameters 7.

In the example illustrated here, according to the flow diagram 1, the installation 2 comprises installation components 3 of the following component types, which are respectively assigned the following process parameters 7:

pipeline sections 5, to which a mass flow M is assigned as process parameter 7, manual valves 10, to which a valve position V is respectively assigned as process parameter 7, actuating valves 11, to which a drivable valve position S is respectively assigned as process parameter 7, pressure sensors 12, to which a pressure P is respectively assigned as process parameter 7, a drivable pump 13, here comprising a centrifugal pump, to which an actuating signal SP is assigned as process parameter 7, containers 14, to which a filling level L is respectively assigned as process parameter 7, and flow meters 15, to which a mass flow M is respectively assigned as process parameter 7.

In specific detail, the installation 2—enumerated in the flow direction—is composed of the (specific) installation components 3 contained in TAB. 1:

TABLE 1

Components 3 of the installation 2, assigned component type and assigned process parameter 7.

| Designation of the installation component | Component type | Assigned (specific) process parameter |
|---|---|---|
| VT.KRC-LP010 | Container 14 | Filling level L1 |
| Without designation | Pipe section 5 | Mass flow M1 |
| VT.KRC-U170 | Manual valve 10 | Valve position V2 |
| Without designation | Pipe section 5 | Mass flow M2 |
| VT.KRC-E030_S | Pressure sensor 12 | Pressure P2 |
| Without designation | Pipe section 5 | Mass flow M3 |
| VT.KRC-E030 | Pump 13 | Actuating signal SP4 |
| Without designation | Pipe section 5 | Mass flow M4 |
| VT.KRC-030_D | Pressure sensor 12 | Pressure P4 |
| Without designation | Pipe section 5 | Mass flow M5 |
| VT.KRC-U210 | Manual valve 10 | Valve position V6 |
| Without designation | Pipe section 5 | Mass flow M6 |
| VT.KRC-U230 | Manual valve 10 | Valve position V7 |
| Without designation | Pipe section 5 | Mass flow M7 |
| VT.KRC-F020 | Flow meter 15 | Mass flow M8 |
| Without designation | Pipe section 5 | Mass flow M8 |
| VT.KRC-070 | Actuating valve 11 | Valve position S9 |
| Without designation | Pipe section 5 | Mass flow M9 |
| VT.KVL-P210 | Pressure sensor 12 | Pressure P9 |
| Without designation | Pipe section 5 | Mass flow M10 |
| VT.KVL-U210 | Actuating valve 11 | Valve position S11 |
| Without designation | Pipe section 5 | Mass flow M11 |
| VT.KVL-P220 | Pressure sensor 12 | Pressure P11 |
| Without designation | Pipe section 5 | Mass flow M12 |
| VT.KVL-F210 | Flow meter 15 | Mass flow M13 |
| Without designation | Pipe section 5 | Mass flow M13 |
| VT.KVL-U230 | Actuating valve 11 | Valve position S14 |
| Without designation | Pipe section 5 | Mass flow M14 |
| VT.KRE-P010 | Container 14 | Filling level L2P, |
| VT.KRE-L110 | | Filling level L2U |
| Without designation | Pipe section 5 | Mass flow M15 |
| VT.KRE-U050 | Actuating valve 11 | Valve position S16 |
| Without designation | Pipe section 5 | Mass flow M16 |
| VT.KRE-U060 | Manual valve 10 | Valve position V17 |
| Without designation | Pipe section 5 | Mass flow M17 |

In this case, the nomenclature of the process parameters presented in FIG. 1 and TAB. 1 is based on the following conventions:

A first part of the process parameter designation is the comprehensive, general designation of the process parameter 7 associated with the respective component 3. The process parameter 7 assigned to a valve 10 is therefore always designated by "V", the process parameter 7 assigned to an actuating valve 11 by "S", the process parameter 7 assigned to a pressure sensor 12 by "P", the process parameter 7 assigned to a pump 13 by "SP" and the process parameter 7 assigned to a container 14 by "L". The process parameter 7 assigned to a pipeline section 5 is designated by "M".

A second part of the name bears a numbering x or y, where both x and y are each a natural number. In this case, a numbering y is assigned to each container 14, while the numbering x is assigned to each pipeline section 5.

The further components 3 are numbered according to a mass flow M which they affect or which affects them. In this case, the process parameter assigned to an (actuating) valve 10, 11 or a pump 13 is always given the same ordinal number as the mass flow Mx of a pipeline section 5 situated downstream in the flow direction, while a pressure sensor 12 is always given the same ordinal number as a pipeline section 5 disposed upstream in the flow direction.

The plurality of sensors for detecting the associated process parameter 7 are assigned to an installation component 3, then a third name part is added to differentiate them, where the third name part specifies the underlying measurement principle. Thus, the designation "LyP" ("level of y pressure") indicates a filling level measurement according to a pressure measurement principle, while the designation "LyU" ("level of y ultrasonic") indicates a filling level measurement according to an ultrasonic measurement principle.

Furthermore, each component type is assigned an initially non-specific general component graph, in which is stored the way in which the component 3 assigned to the respective component type interacts with other components 3 (or with the assigned mass-flow-specific process parameters 7 thereof). In the component graph, as described above, each process parameter 7 considered is assigned a node of the graph, where arrows or edges between the individual nodes describe the interactions. In this case, a positively weighted edge of the component graph represents a deviation change in the same sense, while a negatively weighted edge represents an inverse deviation change. The non-specific component graphs are determined in experiments or mathematical models.

The following FIGS. 2 to 18 elucidate which interactions or non-specific component graphs are assigned to the component types mentioned above. Nodes assigned to observable process parameters 7 are illustrated in a dashed fashion in FIGS. 2 to 18. Furthermore, the designations v are defined as x−1 (or upstream in the flow direction) and the designations n are defined as x+1 (or downstream in the flow direction).

Figure 2:
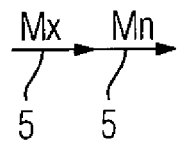
FIG. 2 is an illustration of a piping and instrumentation flow diagram, a first component type, which represents a pipeline section in accordance with the invention.

FIG. 2 shows, in an illustration as a piping and instrumentation flow diagram, a first component type, which generally characterizes a pipeline section 5 with an assigned mass flow Mx and the interaction thereof with a downstream pipeline section 5 with a mass flow Mn (i.e. M(x+1)).

Figure 3:
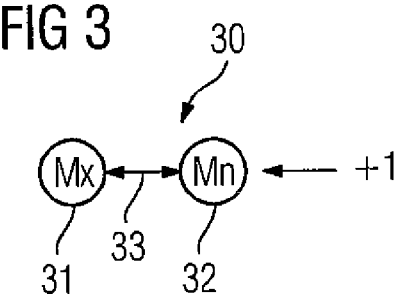
FIG. 3 is an illustration of a component graph assigned to the component type in accordance with FIG. 2.

FIG. 3 illustrates a component graph 30 assigned to this component type. The component graph 30 comprises a first node 31, which is assigned to the mass flow Mx, and a second node 32, which is assigned to the second mass flow Mn. A positively weighted "double edge" 33 (consisting of two oppositely directed edges) indicates that the interaction between the two pipeline sections 5 or the mass flows Mx, Mn thereof is in the same sense. That is, a positive deviation of one mass flow, in accordance with the conservation of mass, brings about a positive deviation of the respective other mass flow, while a negative deviation of one mass flow results in a negative deviation of the respective other mass flow.

For technological data processing handling in a computer, the component graph 30 is represented as a process variable vector $v_{R_x}$ and an assigned adjacency matrix $A_{R_x}$ in accordance with EQU. 1:

$$v_{Rx} = \begin{pmatrix} Mx \\ Mn \end{pmatrix} \quad \text{EQU. 1}$$

$$A_{Rx} = \begin{pmatrix} 0 & 1 \\ 1 & 0 \end{pmatrix}$$

In this case, the off-diagonal elements of the adjacency matrix $A_{Rx}$ having the value "1" correspond to the double edge 33. In this case, the process variable vector $v_{Rx}$ indicates which process parameters are assigned the respective entries in the adjacency matrix.

An entry in the second column of the first row corresponds to the weighting of an edge from the node corresponding to the first process parameter of the process parameter vector to the node corresponding to the second process parameter of the process parameter vector.

Figure 4:
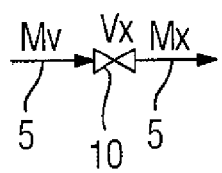
FIGS. 4 and 5 are illustrations of a second component type, which represents a manual valve in accordance with FIGS. 2 and 3, respectively.

FIG. 4 shows, in an illustration as a piping and instrumentation flow diagram, a second component type, which generally characterizes a manual valve 10 with an assigned valve position Vx and the interaction thereof with an upstream pipeline section 5 with a mass flow Mv and a downstream pipeline section 5 with a mass flow Mx.

Figure 5:
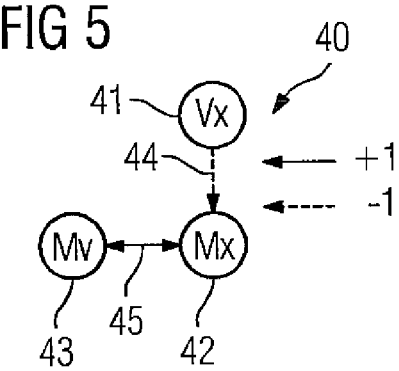

FIG. 5 illustrates an associated component graph 40. The component graph 40 comprises a node 41 assigned to the valve position V, a node 42 assigned to the mass flow Mx, and a node 43 assigned to the mass flow Mv. The valve position V is defined such that as the value of the valve position V increases, the valve 10 is increasingly closed. The valve position V thus inversely affects the mass flow Mx in the pipeline section 5 disposed downstream of the valve 10. In accordance with this inverse influencing, an edge 44 directed from the node 41 to the node 42 is weighted negatively (−1). The influence of the node 41 on the upstream pipeline section 5 or on the mass flow Mv assigned to the upstream pipeline section 5 is represented indirectly by a (positively weighted) double edge 45 running between the nodes 42 and 43.

An assigned process parameter vector $v_{Vx}$ and an assigned adjacency matrix $A_{Vx}$ have the following form:

$$v_{Vx} = \begin{pmatrix} Mv \\ Mx \\ Vx \end{pmatrix} \quad \text{EQU. 2}$$

$$A_{Vx} = \begin{pmatrix} 0 & 1 & 0 \\ 1 & 0 & 0 \\ 0 & -1 & 0 \end{pmatrix}$$

Figure 6:
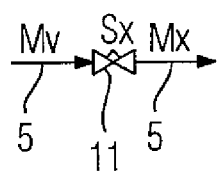
FIGS. 6 and 7 are illustrations of a third component type, which represents an actuating valve in accordance with FIG. 2 and FIG. 3, respectively.
Figure 7:
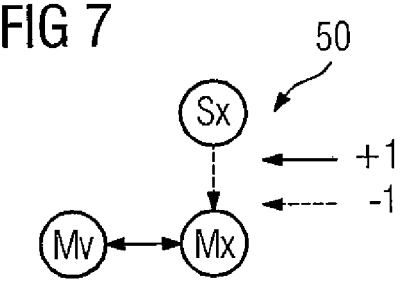

FIG. 6 shows, in an illustration as a piping and instrumentation flow diagram, a third component type, which generally characterizes an actuating valve 10 with an assigned valve position Sx and the interaction thereof with an upstream pipeline section with a mass flow My and a downstream pipeline section 5 with a mass flow Mx. An assigned component graph 50, in accordance with FIG. 7, is constructed analogously to the component graph 40 of a manual valve 10.

Figure 8:
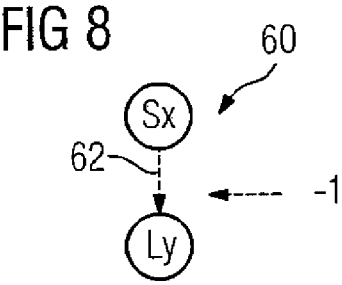
FIG. 8 is an illustration of a component graph of a fourth component type, which characterizes an actuating valve situated upstream of a container in the flow direction in accordance with FIG. 3.
Figure 9:
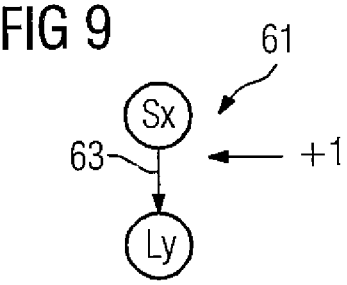
FIG. 9 is an illustration in accordance with FIG. 3, of a component graph of a fifth component type, which characterizes an actuating valve situated downstream of a container in the flow direction in accordance with the invention.

FIG. 8 shows, in a component graph 60 a fourth component type, which describes the interaction of an actuating valve 11 with a container 14 disposed directly downstream in the flow direction. By contrast, FIG. 9 shows, in a component graph 61, a fifth component type, which describes the interaction of an actuating valve 11 with a container 14 disposed directly upstream in the flow direction. FIG. 8 reveals that, in the case of an actuating valve 11 situated upstream of a container 14, a wide open position (valve position S low) brings about a strong inflow into the container 14 and thus an increase in the filling level Ly. This inverse effect is identified by a negatively weighted edge 62. FIG. 9 reveals that, by contrast, a wide open actuating valve 11 situated downstream of a container 14 brings about an increased outflow from the container 14 and thus a reduction in the filling level Ly. This mode of operation in the same sense is identified by a positively weighted edge 63.

Respectively associated process parameter vectors $v_{STy}$ (for an actuating valve 11 with downstream container 14) and $v_{TSy}$ (for an actuating valve 11 with upstream container 14) and respectively assigned adjacency matrices $A_{STy}$ and $A_{TSy}$ have the following form:

$$v_{STy} = v_{TSy} = \begin{pmatrix} Ly \\ Sx \end{pmatrix} \quad \text{EQU. 3}$$

$$A_{STy} = \begin{pmatrix} 0 & 0 \\ -1 & 0 \end{pmatrix}$$

$$A_{TSy} = \begin{pmatrix} 0 & 0 \\ 1 & 0 \end{pmatrix}$$

Figure 10:
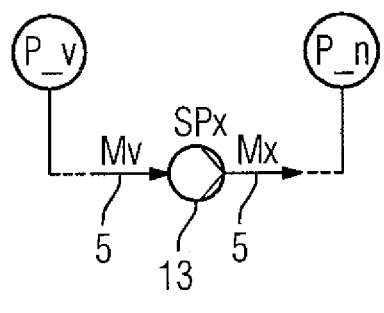
FIGS. 10 and 11 are illustrations of a sixth component type, which represents a pump in accordance with FIGS. 2 and 3, respectively.
Figure 11:
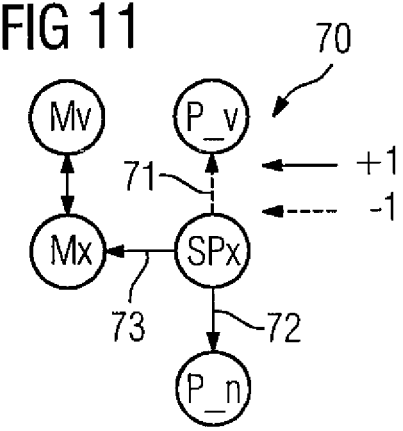

FIG. 10 shows, in an illustration as a piping and instrumentation flow diagram, a sixth component type, which generally characterizes a drivable (centrifugal) pump 13 with an assigned actuating signal SPx and the interaction thereof with an upstream pipeline section 5 with a mass flow Mv and a downstream pipeline section 5 with a mass flow Mx and with an upstream pressure measuring instrument 12 with a pressure P_v (_v=x−1, x−2, . . . ) and a downstream pressure measuring instrument 12 with a pressure P_n (_n=x, x+1, x+2, . . . ). An assigned component graph 70 (FIG. 11) reveals that the pump 13 or the actuating signal SPx thereof has an inverse effect on arbitrary pressures P_v (measured downstream), while the pump 13 or the actuating signal SPx thereof has an effect in the same sense on arbitrary pressures P_n measured upstream. That is, in the case of an increased pump capacity of the pump 13, a pressure Pv upstream of the pump 13 decreases (identified by a negatively weighted edge 71), while an increase in the pump capacity brings about an increase in the pressure Px measured downstream of the pump 13 (identified by a positively weighted edge 72). The effect on the mass flows Mx and Mv is likewise in the same sense in accordance with an edge 73.

A process variable vector $v_{Kx}$ assigned to the component graph and an assigned adjacency matrix $A_{Kx}$ have the following form:

$$v_{Kx} = \begin{pmatrix} Mv \\ Mx \\ SPx \\ P\_v \\ P\_n \end{pmatrix} \quad \text{EQU. 4}$$

$$A_{Kx} = \begin{pmatrix} 0 & 1 & 0 & 0 & 0 \\ 1 & 0 & 0 & 0 & 0 \\ 0 & 1 & 0 & -1 & 1 \\ 0 & 0 & 0 & 0 & 0 \\ 0 & 0 & 0 & 0 & 0 \end{pmatrix}$$

The detection of the pressures P_v and P_n is optional. Values for one or both pressures P_v and P_n can correspondingly be absent. Here, the corresponding entry in the vector $v_{Kx}$ and the corresponding row and column in the adjacency matrix $A_{Kx}$ are removed.

Figure 12:
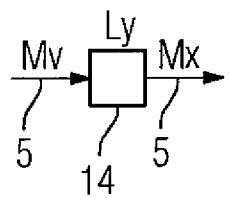
FIGS. 12 and 13 are illustrations of a seventh component type, which represents a container in accordance with FIGS. 2 and 3, respectively.
Figure 13:
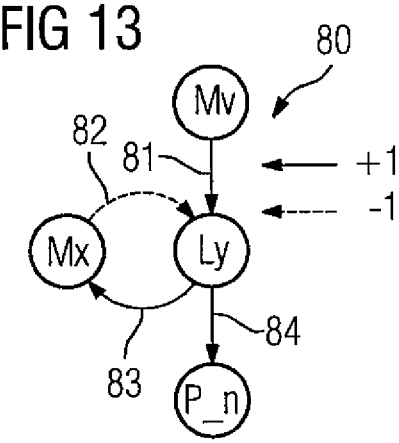

FIG. 12 shows a seventh component type, which characterizes a container 14 and the interaction thereof with an upstream pipeline section 5 with a mass flow Mv and a downstream pipeline section 5 with a mass flow Mx. The interactions between the filling level Ly assigned to the container 14 and the mass flows Mx, Mv can be gathered from a component graph 80 (FIG. 13). Accordingly, an inflowing mass flow Mv increases the filling level Ly in the container 14 in accordance with a positively weighted edge 81 in the same way as a reduced outflow from the container in accordance with a negatively weighted edge 82. Furthermore, an increased filling level Ly in accordance with a positively weighted edge 83 results in an increased mass flow Mx in the pipeline section 5 disposed downstream of the container 14. The component graph 80 additionally reveals that pressures P_n assigned to pressure sensors 12 situated downstream of the container 14 in the flow direction, in accordance with a positively weighted edge 84, change in the same sense with the filling level Ly. An assigned process parameter vector $v_{T1y}$ and an assigned adjacency matrix $A_{T1y}$ have the following form:

$$v_{T1y} = \begin{pmatrix} Mv \\ Mx \\ Ly \\ P\_n \end{pmatrix} \quad \text{EQU. 5}$$

$$A_{T1y} = \begin{pmatrix} 0 & 0 & 1 & 0 \\ 0 & 0 & -1 & 0 \\ 0 & 1 & 0 & 1 \\ 0 & 0 & 0 & 0 \end{pmatrix}$$

Figure 14:
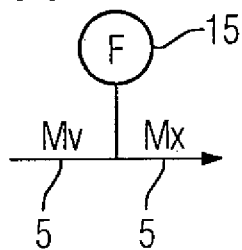
FIGS. 14 and 15 are illustrations an eighth component type, which represents a flow meter in accordance with FIGS. 2 and 3, respectively.
Figure 15:
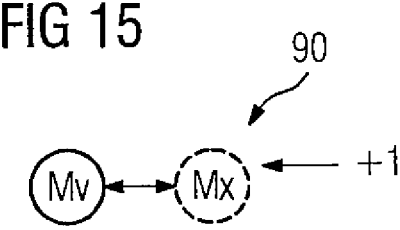

FIG. 14 shows, in a further flow diagram excerpt, the eighth component type, which describes a flow meter 15 according to the type. A component graph 90 (illustrated in FIG. 15) assigned to the flow meter 15 reveals that a process parameter (mass flow) assigned to the flow meter 15 is not represented as a separate node. Rather, only the mass flow Mx assigned to the downstream pipeline section 5 is identified as observable (represented by a dashed circle). An associated process parameter vector $v_{Mx}$ and an assigned adjacency matrix $A_{Mx}$ are accordingly determined analogously to EQU. 1:

$$v_{Mx} = v_{Rx} A_{Mx} = A_{Rx} \quad \text{EQU. 6}$$

Figure 16:
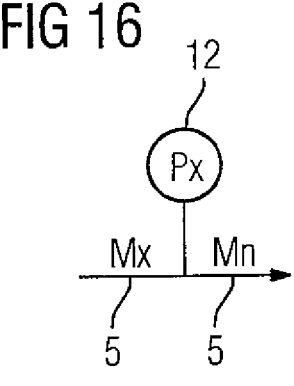
FIG. 16 is an illustration of a ninth component type, which represents a pressure measuring instrument in accordance with FIG. 2.
Figure 17:
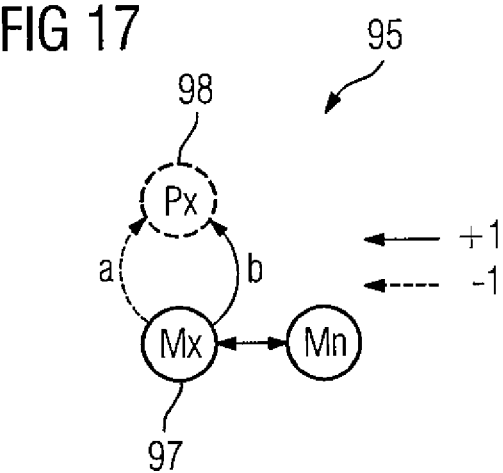
FIG. 17 is an illustration of the ninth component type "pressure measuring instrument" in the context of a "pump overall graph" in accordance with FIG. 3.

FIG. 16 illustrates, in an illustration as a piping and instrumentation flow diagram, a ninth component type, which generally describes a pressure sensor 12 and the interaction thereof with two adjoining pipeline sections 5.

Pressure sensors 12 constitute a special feature insofar as a relationship between a pressure detected by a pressure sensor and a mass flow in an installation comprising both valves and pumps is not unambiguous, but rather also depends on the position of the individual components with respect to one another. It is found that with an increasing pump capacity and correspondingly increasing mass flow, a pressure sensor disposed downstream of the pump in the flow direction detects an increasing pressure, while a pressure sensor disposed upstream of the pump detects a continuously decreasing pressure. By contrast, if the mass flow is increased by opening a valve with a pump capacity remaining the same, then this results—in the case of pressure sensors disposed upstream of the valve in the flow direction—in a decrease in the pressure, while pressure sensors disposed downstream of the valve in the flow direction detect an increase in the pressure.

In order to decouple the mode of operation of pumps and valves, therefore, two partial graphs are created for each installation, where a first "pump graph" comprises all components, i.e., at least one pump, but no valves or actuating valves, while a second "valve graph" comprises all components, in particular at least one valve or actuating valve, but no pump.

Figure 18:
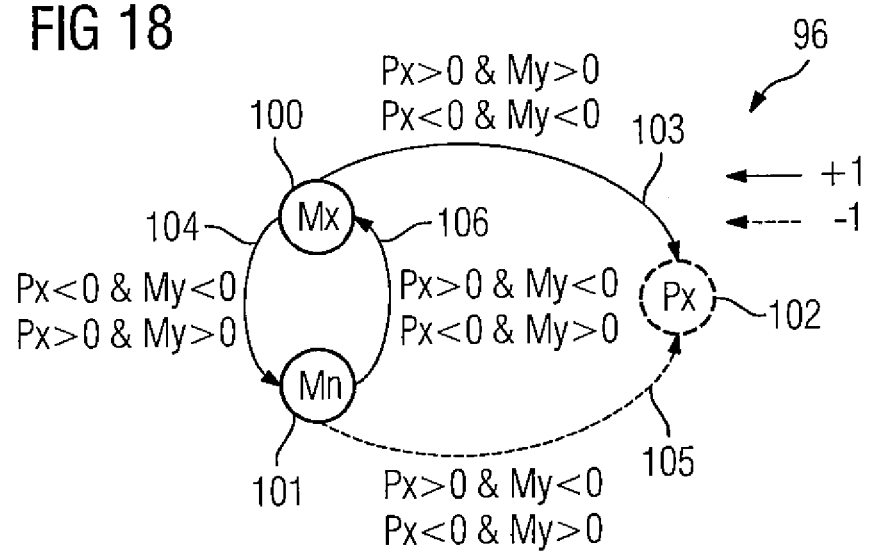
FIG. 18 is an illustration of the ninth component type "pressure measuring instrument" in the context of a "valve overall graph" in accordance with FIG. 3.

Accordingly, an arbitrary pressure sensor 12 is assigned two different component graphs 95 (FIG. 17) and 96 (FIG. 18). The component graph 95 serves for representing the pressure sensor 12 or the assigned pressure Px thereof in the context of a pump graph. The component graph 95 comprises a node 97 assigned to the pipeline section 5 disposed upstream of the pressure sensor 12 or to the associated mass flow Mx thereof, and a node 98 assigned to the pressure Px detected by the pressure sensor 12 (and thus identified as observable). Here, the component graph 95 has a first edge a from the node 97 to the node 98, which edge is negatively weighted, where this edge a has validity only when the associated pressure sensor 12 is arranged upstream of the at least one pump 13 in the flow direction. By contrast, a second, positively weighted edge b has validity only when the associated pressure sensor 12 is arranged downstream of the at least one pump 13 in the flow direction. An assigned nonspecific process parameter vector $v_{PPx}$ and an assigned adjacency matrix $A_{PPx}$ for describing an arbitrary pressure sensor 12 in a pump graph have the following form:

$$v_{PPx} = \begin{pmatrix} Mx \\ Mn \\ Px \end{pmatrix} \quad \text{EQU. 7}$$

$$A_{PPx} = \begin{pmatrix} 0 & 1 & a \text{ or } b \\ 1 & 0 & 0 \\ 0 & 0 & 0 \end{pmatrix}$$

The component graph 96 for describing the pressure sensor 12 in a valve graph likewise comprises a node 100 (Mx), a node 101 (Mn) and a node 102 (Px)—identified as observable. Furthermore, edges linked with conditions are provided, where each edge is taken into account only when the conditions linked thereto are met. In the illustrated conditions, Px designates the observable pressure of the pressure sensor 12, while My designates an observable mass flow that changes in the same sense with the corresponding mass flow Mx. Here, a condition assigned to a positively weighted edge 103 substantially serves to deduce whether the pressure Px changes in the same sense with the mass flow My and thus with the mass flow Mx disposed upstream of the pressure sensor 12, i.e., whether the pressure sensor 12 is situated in the flow direction behind an (actuating) valve 10 or respectively 11 of the installation 2 that changes its valve position V. In this case, both the edge 103 and an edge 104 have validity. By contrast, if the pressure Px changes inversely with respect to the mass flow My or respectively Mx, then it can be assumed that the pressure sensor 12 is situated upstream of an (actuating) valve 10, 11 that changes its valve position V. In this case, a negatively weighted edge 105 and an edge 106 have validity.

For the purpose of the subsequent evaluation of such a valve graph, it is also possible only to sequentially pass through those edges that are present under the conditions described above. A corresponding process parameter vector $v_{PVx}$ and an adjacency matrix $A_{PVx}$ have the following form:

$$v_{PVx} = \begin{pmatrix} Mx \\ Mn \\ Px \end{pmatrix} \quad \text{EQU. 8}$$

$$A_{PVx} = \begin{pmatrix} 0 & 1 & 1 \\ 1 & 0 & -1 \\ 0 & 0 & 0 \end{pmatrix}$$

In order to represent how the individual components 3 within the installation 2 interact with one another, the individual component graphs 30, 40, 50, 60, 61, 70, 80, 90, 95, 96 can be combined to form an overall graph.

Figure 19:
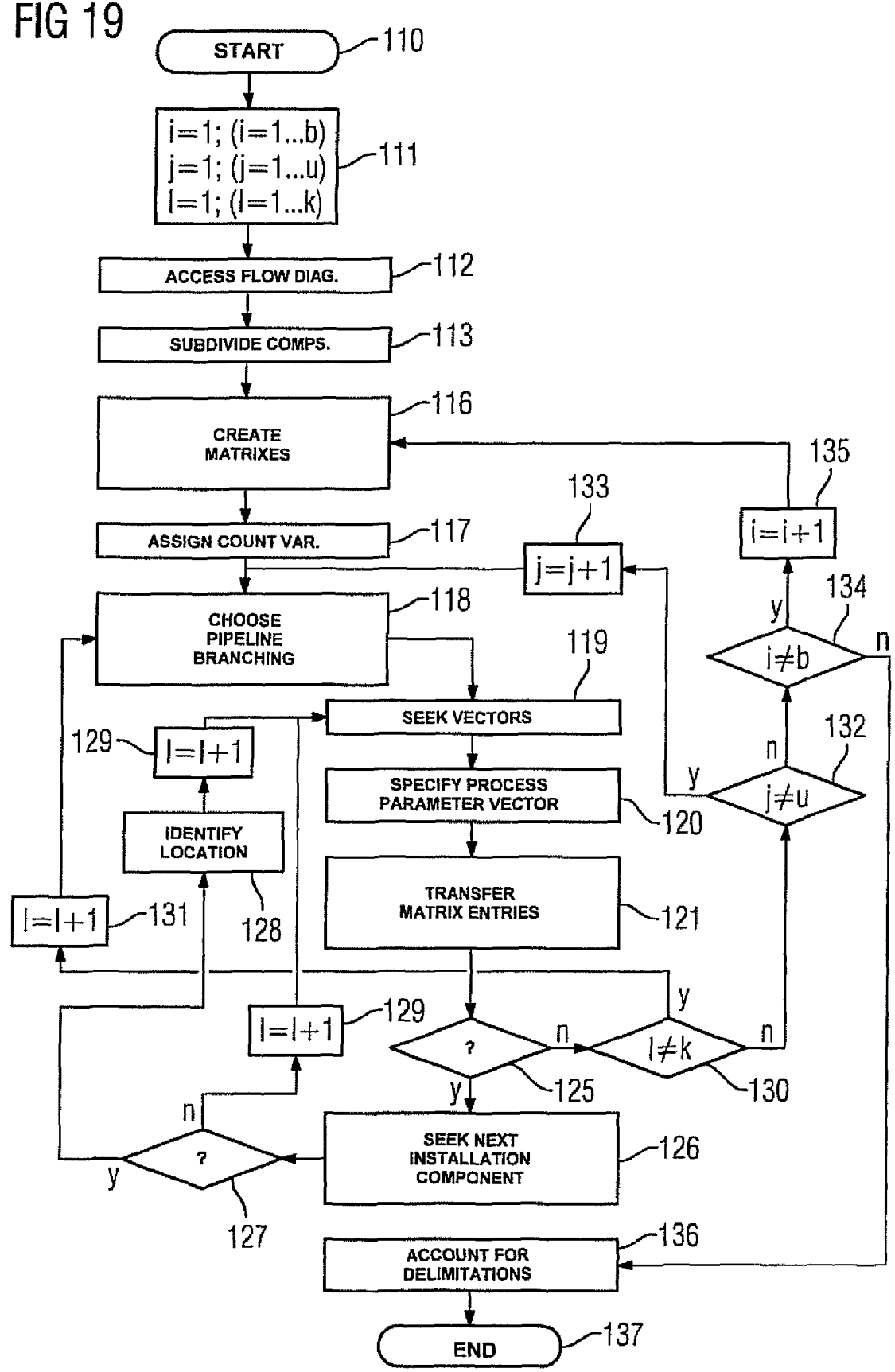
FIG. 19 is a flowchart of a method for creating a system of directed weighted overall graphs of the installation on the basis of the piping and instrumentation flow diagram in accordance with FIG. 1.

The overall graph is created in an automated manner according to a (creation) method described with reference to FIG. 19:

After a program start 110, firstly in a first step 111, counting variables i, j, l are each set to 1.

In a second step 112, the piping and instrumentation flow diagram 1 (present as an XML file) of the industrial installation 2 is accessed, where all process parameters 7 assigned to the components 3 and pipeline sections 5 of the installation 2 are uniquely designated and numbered in accordance with the nomenclature introduced above. The variables x and y generally used above are consecutively numbered according to the following procedure in step 112:

Firstly, all process parameters Ly assigned to the containers 14 are consecutively numbered, where y extends from 1 to t. In this case, t corresponds to the number of containers 14 present in the installation.

Subsequently, all mass flows Mx assigned to the pipeline sections 5 are consecutively numbered, where x extends from 1 to m. Here, m corresponds to the number of pipeline sections 5 present in the installation. In this case, the numbering (x=1) begins in the flow direction behind a container 14. If a pipeline section 5 (or the assigned mass flow Mx) opens into a container 14, then the numbering is continued behind the container (if a part of the pipeline that has not yet been taken into account leads out of the container 14). Alternatively, if a pipeline section 5 (or the assigned mass flow Mx) opens into a container 14, then the numbering is continued behind a further container 14 (if another container 14 that has not been taken into account is present) or at a pipeline branching.

In a third step 113, the components of the installation 2 are subdivided into b operating state groups, where the counting variable i is assigned to the operating state groups. This preferably occurs automatically if the automation system "knows" the operating states. In order to enable an automated definition of the operating state groups, the operating states can, for example, be formulated as recipe steps of a batch system (in accordance with Industry Standard Architecture (ISA) standard 88) or as steps of an SFC (Sequential Flow Chart) and stored in computer-readable form in the automation system. In these cases, the automation system automatically predefines valve positions and pump capacities for each operating state. Otherwise, however, a manual definition is also possible.

In this case, an operating state group comprises a group of installation components 3 which are used in a specific operating state, and further installation components 3 which, although they are not used in the respective operating state, can nevertheless influence the respective operating state.

In the present exemplary illustration, the installation 2 can be operated either in a first operating state A or in a second operating state B.

In the operating state A, a fluid situated in the installation 2 is conveyed with the aid of the pump 13 (with assigned process parameter SP4) from the first container 14, designated by "RES1", into the second container 14, designated by "RES2", wherein the actuating valve 11 designated by "VT.KRE-U050" is closed.

Accordingly, a first operating state group 114 (FIG. 1) (i=1) comprises all installation components 3 and pipe sections 5 via which the container 14 having the designation "RES1" is connected in the flow direction to the container 14 having the designation "RES2".

In the operating state B, the fluid is subsequently filled, proceeding from the container 14 having the designation "RES2" into the container 14 having the designation "RES1", the actuating valve 11 designated by "VT.KRE-U050" then being open. Moreover, in the second operating state B, the manual and actuating valves (with assigned process parameters V2 and S14) designated by "VT.KRC-U170" and "VT.KVL-U230" are closed.

Accordingly, a second operating state group 115 comprises all installation components 3 and pipe sections 5 via which the container 14 having the designation "RES2" is connected in the flow direction to the container 14 having the designation "RES1".

The containers 14, more precisely the filling level measuring instruments situated therein and having the designations "VT.KRC-P010" or respectively "VT.KRE-P010" and "VT.KRE-L110", are each associated with both operating state groups 114 and 115.

Furthermore, the actuating valve 11 designated by "VT.KRE-U050" is associated with the first operating state group 114 as delimitation, especially because this valve, i.e., in a fault situation, can influence the process parameters 7 of the components 3 used in the operating state A. The manual and actuating valves designated by "VT.KRC-U170" and "VT.KVL-U230" are likewise associated with the second operating state group 115 as delimitations, especially since these valves, in particular in a fault situation, can influence the process parameters 7 of the components 3 used in the operating state B.

For the sake of clarity, a separate operating state graph is created for each operating state group, the graph in turn comprising in each case two partial graphs, i.e., a pump graph and a valve graph. Accordingly, in a subsequent step 116, for the i-th operating state group depending on the type and number of the installation components 3 of said group, two process variable vectors $v_{SDG(i)V}$ and $v_{SDG(i)P}$ are created. Here, the first vector $v_{SDG(i)V}$ comprises all components or assigned process parameters of the i-th operating state group with the exception of the pumps (or pump signals SP), while $v_{SDG(i)P}$ in accordance with EQU. 9 comprises all components of the i-th operating state group with the exception of valves (or the valve positions). Moreover, each of the vectors $v_{SDG(i)V}$ and respectively $v_{SVG(i)P}$ comprises those installation components that delimit the operating state group and, consequently, can also affect the operating state group or measure boundary conditions of the operating state group, but which themselves are not used in the associated operating state. Here, the process parameters 7 contained in the vectors $v_{SDG(i)V}$ and $v_{SDG(i)P}$ respectively each correspond to nodes of the graph to be created.

$$v_{SDG(i)V} = \begin{pmatrix} Mx \\ \vdots \\ Lx \\ \vdots \\ Px \\ \vdots \\ Vx \\ \vdots \\ Sx \\ \vdots \\ Pv \\ \vdots \end{pmatrix} \quad \text{EQU. 9}$$

$$v_{SDG(i)P} = \begin{pmatrix} Mx \\ \vdots \\ Lx \\ \vdots \\ SPx \\ Pv \\ \vdots \end{pmatrix}$$

Furthermore, in step 116, two empty adjacency matrices $A_{SDG(i)V}$ and $A_{SDG(i)P}$ are created as zero matrices, the number of rows and columns of which respectively corresponds to the length of the vector $v_{SDG(i)V}$ and $v_{SDG(i)P}$.

In the general case, subsequently in a further step 117, the i-th operating state group is subdivided into u subsystems, where each subsystem in turn comprises a portion of the installation components 3 associated with the i-th operating state group. Here, all of the installation components 3 of a subsystem are connected to one another at least indirectly by respective pipeline sections 5. In this case, a respective container 14 is used as a boundary or boundary component of a first subsystem with respect to a second subsystem. In this case, the container 14 delimiting two subsystems from one another is always respectively associated with both adjoining subsystems. The subdivision of the operating state groups into subsystems is performed automatically by the automation system based on the piping and instrumentation flow diagram—stored as an XML file.

In the example in accordance with FIG. 1, however, only a single subsystem is found in the first operating state group.

The individual subsystems are assigned the counting variable j, where j extends from 1 to u, and where u corresponds to the number of subsystems in the respective superordinate operating state group.

In the subsequent sequence of steps, the j-th subsystem, comprising k installation components 3, is processed. The counting variable l is assigned to the installation components 3.

In this case, in step 118, a container 14 having an outflow into the relevant j-th subsystem or—if there is no longer any container present that is not been taken into account—a pipeline branching is chosen as the start point. In a subsequent step 119, the initially non-specific process parameter vector and the non-specific adjacency matrix are sought for the l-th installation component 3 in accordance with its component type.

In the subsequent step 120, the process parameter vector is specified for the l-th installation component 3. Here, the non-specific names of the variables in the process parameter vector of the l-th component are initially adapted to the actual names—in accordance with their unique numbering from step 112. Moreover, if appropriate the number and if appropriate the position of the pressure sensors 12 present in the j-th subsystem are taken into account.

By way of example, for the pump 13 in the flow diagram 1 from FIG. 1, the process parameter vector $v_{Kx}$ in accordance with EQU. 4 is specified as process parameter vector $v_{K4}$ and the component adjacency matrix $A_{Kx}$ from EQU. 4 is specified as $A_{K4}$:

$$v_{K4} = \begin{pmatrix} M_3 \\ M_4 \\ SP_4 \\ P_2 \\ P_4 \\ P_9 \\ P_{11} \end{pmatrix} \quad \text{EQU. 10}$$

$$A_{K4} = \begin{pmatrix} 0 & 1 & 0 & 0 & 0 & 0 & 0 \\ 1 & 0 & 0 & 0 & 0 & 0 & 0 \\ 0 & 1 & 0 & -1 & 1 & 1 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

In the specifying step, "P_v" was replaced by "$P_2$" and "P_n" was replaced by "$P_4$", "$P_9$" and "$P_{11}$".

In accordance with the specifying step, in a further step 121, the entries in the now specified component adjacency matrices are transferred to the corresponding positions of the adjacency matrix $A_{SDG(i)V}$ and respectively $A_{SDG(i)P}$. An entry that, in the component adjacency matrix, corresponds to an edge from a first specific process parameter to a second specific process parameter is in this case entered at a position of the adjacency matrix $A_{SDG(i)V}$ and respectively $A_{SDG(i)P}$ that likewise corresponds to an edge from the same first process parameter to the same second process parameter.

A subsequent interrogation 125 involves interrogating whether the l-th component is not a container or tank. If this condition is met (branch y), i.e., if the l-th component is not a tank, then in step 126 the next installation component 3 is sought in the flow direction along a pipeline section 5 proceeding from the l-th component, where a location of a pipeline branching identified, if appropriate, in accordance with an interrogation 127 is stored in a step 128. The branching can be, for example, a T segment of a pipeline or a three-way valve. The branchings are correspondingly stored as installation components 3.

In step 129, the counting variable l is subsequently increased by 1 and consequently, the method proceeds through steps 119 to 121 for the next installation component 3 of the j-th subsystem.

if the l-th component is a container (branch n at interrogation 125), then a subsequent interrogation 130 involves checking whether the component is not yet the last component k of the j-th subsystem (l not equal to k). If so (branch y of the interrogation 130), in a step 131 in turn the counting variable l is increased by 1 and a further start point of the j-th subsystem is sought, i.e, in turn either a further container or a pipeline branching possibly stored.

Proceeding from this new start point, the method once again proceeds through steps 119 to 126 until a container is once again reached.

If the l-th installation component is a container and if all components of the j-th subsystem have been processed (branch n of the interrogation 130), a further interrogation 132 involves checking whether all subsystems have not yet been processed (j not equal to u). If j is not equal to u (branch y at interrogation 132), in step 133 j is increased by 1 and the method proceeds through steps 118 to 126 for the next subsystem until all k components of the subsystem have in turn been processed.

If all the subsystems have been processed (branch n at interrogation 132), an interrogation 134 involves checking whether all operating state groups have not yet been processed. If this is the case (branch y), then in step 135 the running variable i is increased by 1 and, proceeding from step 116, a further pair of adjacency matrices $A_{SDG(i)V}$ and respectively $A_{SDG(i)P}$ is created for a further operating state group i.

In the present exemplary application, only one process parameter vector $v_{SDG2V}$ and one empty adjacency matrix $A_{SDG2V}$ are created for the second operating state group 115 (which comprises no pump).

$$v_{SDG2V} = \begin{pmatrix} M15 \\ M16 \\ M17 \\ L1P \\ L2P \\ L2U \\ V17 \\ S16 \\ V2 \\ S14 \end{pmatrix} \quad \text{EQU. 11}$$

If all operating state groups b have also been processed (branch n at interrogation 134), then step 136 involves also taking account of the delimitations of the individual operating state groups, i.e., in the present case the valve "VT.KRE-U050" for the first operating state group 114 and the valves "VT.KRC-U170" and "VT.KVL-U230" for the second operating state group 115. Afterward, the system of overall graphs of the industrial installation (consisting of b pairs of operating state graphs) is created at the end 137 of the program sequence.

Figure 20:
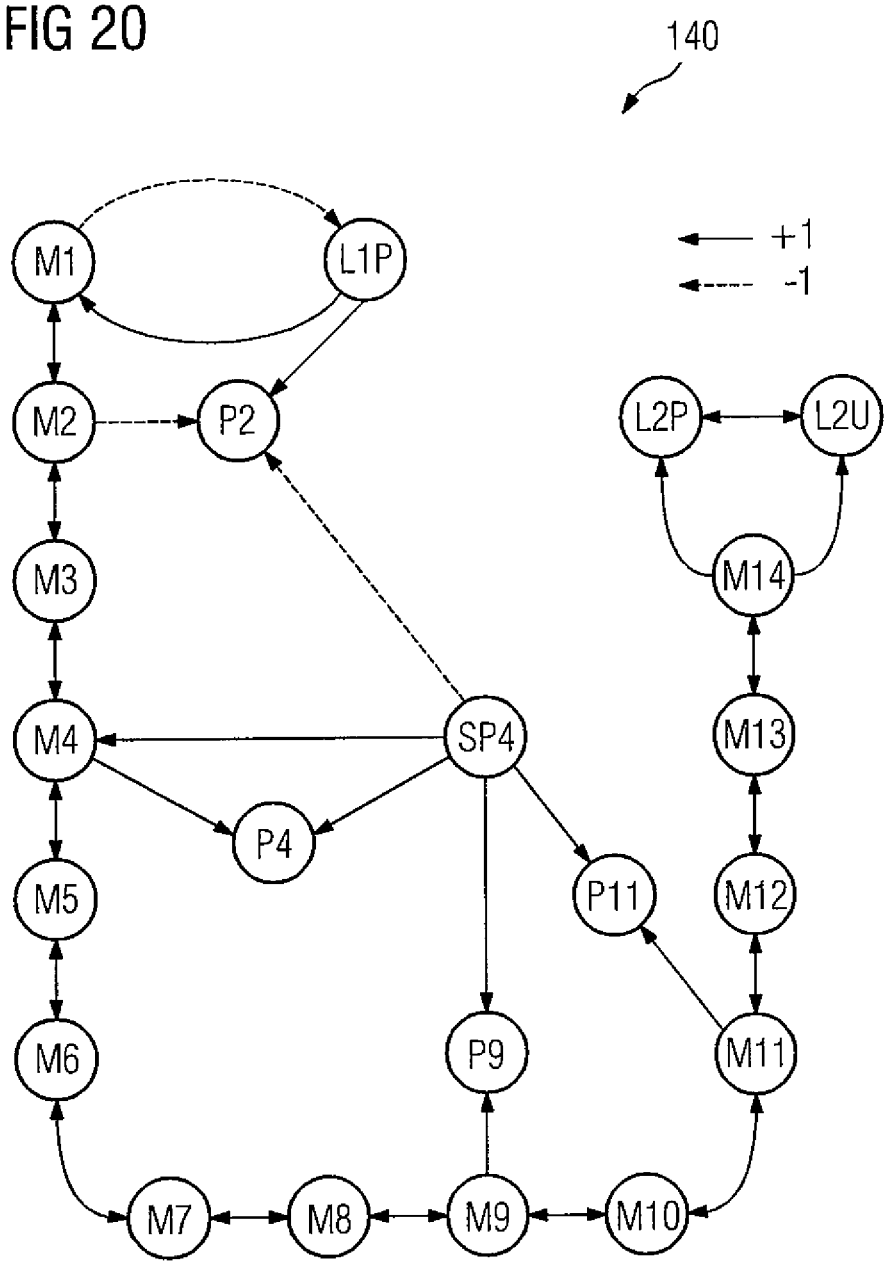
FIG. 20 is a schematic illustration of shows a directed weighted "pump overall graph" of the installation, which graph is assigned to a first operating state in accordance with the invention.
Figure 21:
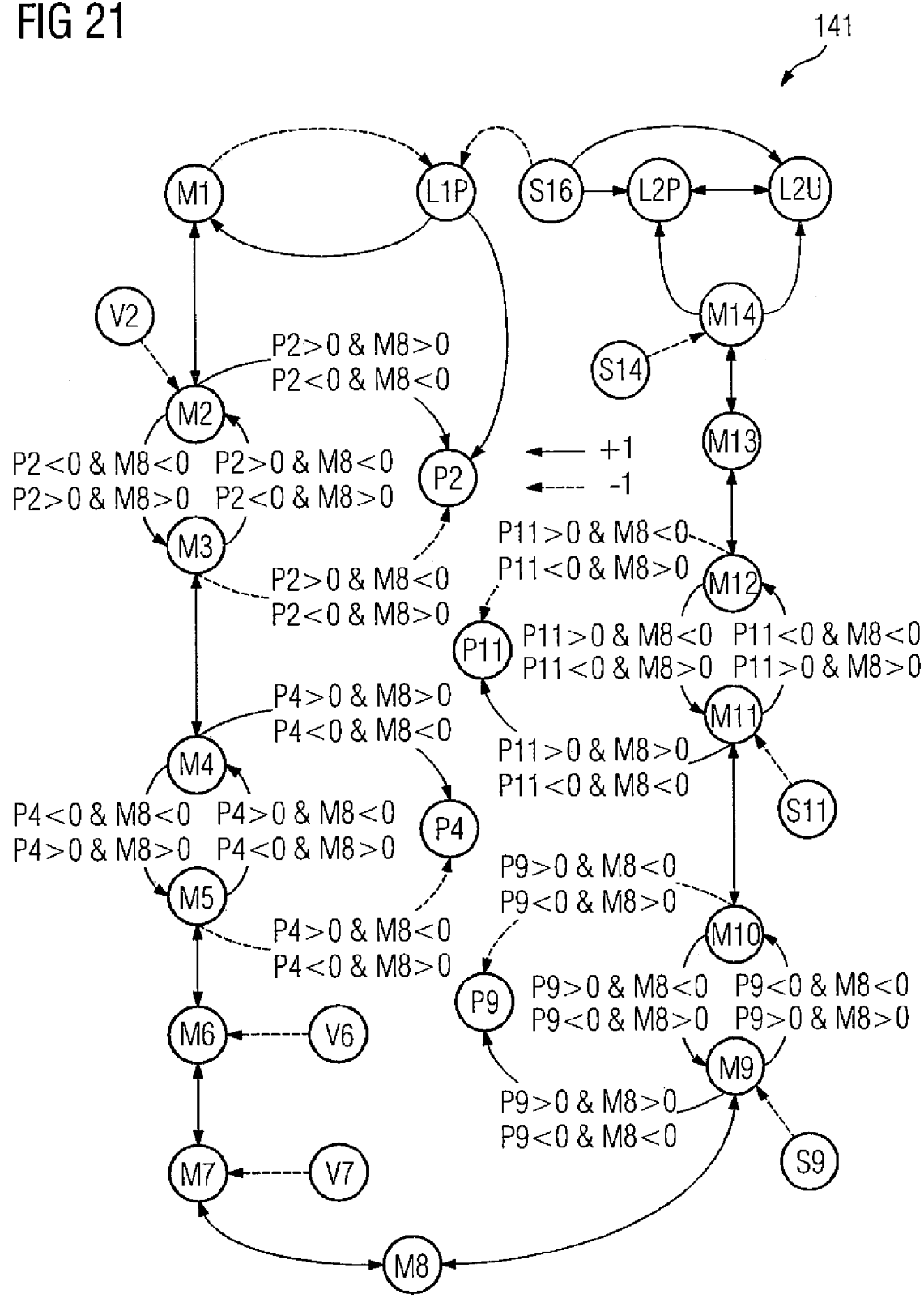
FIG. 21 is a schematic illustration of a directed weighted "valve overall graph" of the installation, which is likewise assigned to the first operating state in accordance with the invention.

For the above exemplary application, the pump overall graph 140 shown in FIG. 20 and the valve overall graph 141 shown in FIG. 21 thereby arise for the first operating state 1. The valve overall graph 142 shown in FIG. 22 correspondingly arises for the second operating state. The overall graphs 140, 141 and 142 together form the system of overall graphs of the installation 2 that is to be created in accordance with the method of the invention.

In accordance with conventions mentioned above, these graphs can also be represented as adjacency matrices.

Figure 23:
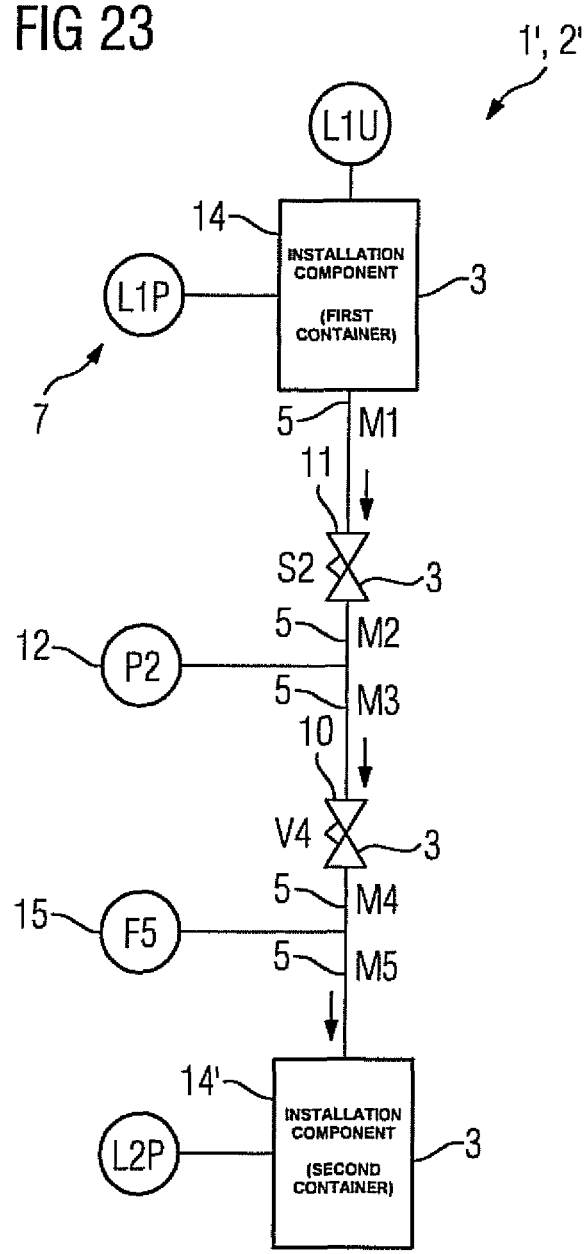
FIG. 23 is a schematic block diagram of a piping and instrumentation flow diagram of a further (industrial) installation in accordance with the invention.

In order that at least one graph determined in this way is made evaluatable by the ESFA method, fault nodes are introduced after the creation. This is explained below based on a second exemplary application, simplified further, for reasons of better clarity. In this regard, FIG. 23 shows a piping and instrumentation flow diagram 1' of an exemplary further (industrial) installation 2' comprising as components 3 a first container 14, to which two process parameters L1U and respectively L1P are assigned, an actuating valve 11, to which a process parameter S2 is assigned, a pressure sensor 12, to which a process parameter P2 is assigned, a manual valve 10, to which a process parameter V4 is assigned, a flow meter 15, to which a mass flow M5 is assigned as process parameter, and a second container 14', to which a process parameter L2P is assigned. The individual components 3 are connected to one another by five pipeline sections 5.

Figure 24:
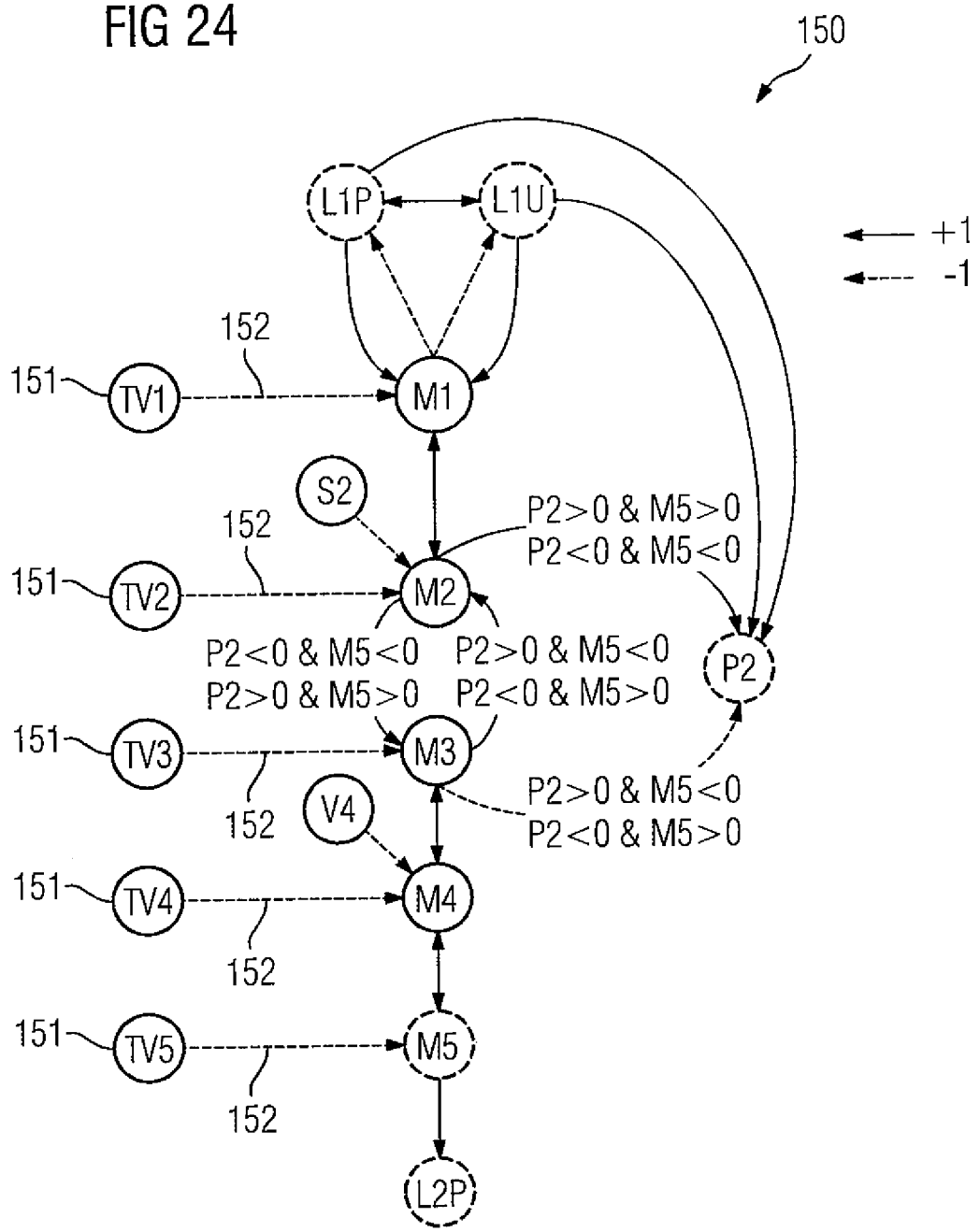
FIG. 24 is a schematic illustration of a directed weighted "valve overall graph" of the installation in accordance with FIG. 23.

The valve graph 150 of the installation 2' determined according to the creation method described above is shown in FIG. 24. The associated process parameter vector $V_{SDG1V}$ and the associated adjacency matrix $A_{SDG1V}$ can be gathered from EQU. 12 and EQU. 13, respectively:

$$v_{SDG(1)V} = \begin{pmatrix} M1 \\ M2 \\ M3 \\ M4 \\ M5 \\ L1P \\ L1U \\ L2P \\ P2 \\ V4 \\ S2 \end{pmatrix} \quad \text{EQU. 12}$$

$$A_{SDG(1)V} = \begin{pmatrix} 0 & 1 & 0 & 0 & 0 & 0 & -1 & -1 & 0 & 0 & 0 \\ 1 & 0 & 1 & 0 & 0 & 0 & 0 & 0 & 0 & 1 & 0 & 0 \\ 0 & 1 & 0 & 1 & 0 & 0 & 0 & 0 & 0 & -1 & 0 & 0 \\ 0 & 0 & 1 & 0 & 1 & 0 & 0 & 0 & 0 & 0 & 0 \\ 0 & 0 & 0 & 1 & 0 & 0 & 0 & 1 & 0 & 0 & 0 \\ 1 & 0 & 0 & 0 & 0 & 0 & 0 & 1 & 0 & 1 & 0 & 0 \\ 1 & 0 & 0 & 0 & 0 & 0 & 1 & 0 & 0 & 1 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & -1 & 0 & 0 & 0 & 0 & 0 & 0 & 0 \\ 0 & -1 & 0 & 0 & 0 & 0 & 0 & 0 & 0 & 0 & 0 \end{pmatrix} \quad \text{EQU. 13}$$

A blockade, which is designated as "partial blockage" TV and reduces a mass flow, in a pipeline section 5 is chosen by way of example as a fault cause. Here, a respective fault cause node 151 can be created for each of the pipeline sections 5 or the assigned mass flows Mx (x=1, 2, . . . , 5) thereof, where a negatively weighted edge 152 in each case extends from the node 151 representing a partial blockage TVx to the corresponding node representing the respective mass flow Mx.

An assigned fault cause vector vF reads as follows:

$$v_F = \begin{pmatrix} TV1 \\ TV2 \\ TV3 \\ TV4 \\ TV5 \end{pmatrix} \quad \text{EQU. 14}$$

Relative to a process parameter vector associated with the above graph $$v_{SDG(i)V}{}^T = (M1\ M2\ M3\ M4\ M5\ L1P\ L1U\ L2P\ P2\ V4\ S2) \quad \text{EQU. 15}$$

(shown as transposed vector $v^T_{SDG(i)V}$ in EQU. 15 for the sake of clarity) the associated fault cause adjacency matrix, analogously using the notation introduced above, has the following form $$A_F = \begin{pmatrix} -1 & 0 & 0 & 0 & 0 & 0 & 0 & 0 & 0 & 0 & 0 \\ 0 & -1 & 0 & 0 & 0 & 0 & 0 & 0 & 0 & 0 & 0 \\ 0 & 0 & -1 & 0 & 0 & 0 & 0 & 0 & 0 & 0 & 0 \\ 0 & 0 & 0 & -1 & 0 & 0 & 0 & 0 & 0 & 0 & 0 \\ 0 & 0 & 0 & 0 & -1 & 0 & 0 & 0 & 0 & 0 & 0 \end{pmatrix} \quad \text{EQU. 16}$$

Further fault types are provided in accordance with TAB. 2 below.

TABLE 2

Overview of fault causes

| Component | Fault type |
|---|---|
| Pipeline section 5 | Partial blockage |
| | Blockage |
| | Leak |
| | Fracture |
| (Actuating) valve 10, 11 | Partial blockage |
| | Blockage |
| | Leak |
| | Open too far |
| | Closed too far |
| (Centrifugal) pump 13 | Pump capacity excessively weak |
| | Pump capacity excessively strong |
| | Leak |
| | Off |
| Container 14 | Leak |
| | Fracture |
| Sensor 13, 15 | Indicates excessively high value |
| | Indicates excessively low value |

Figure 25:
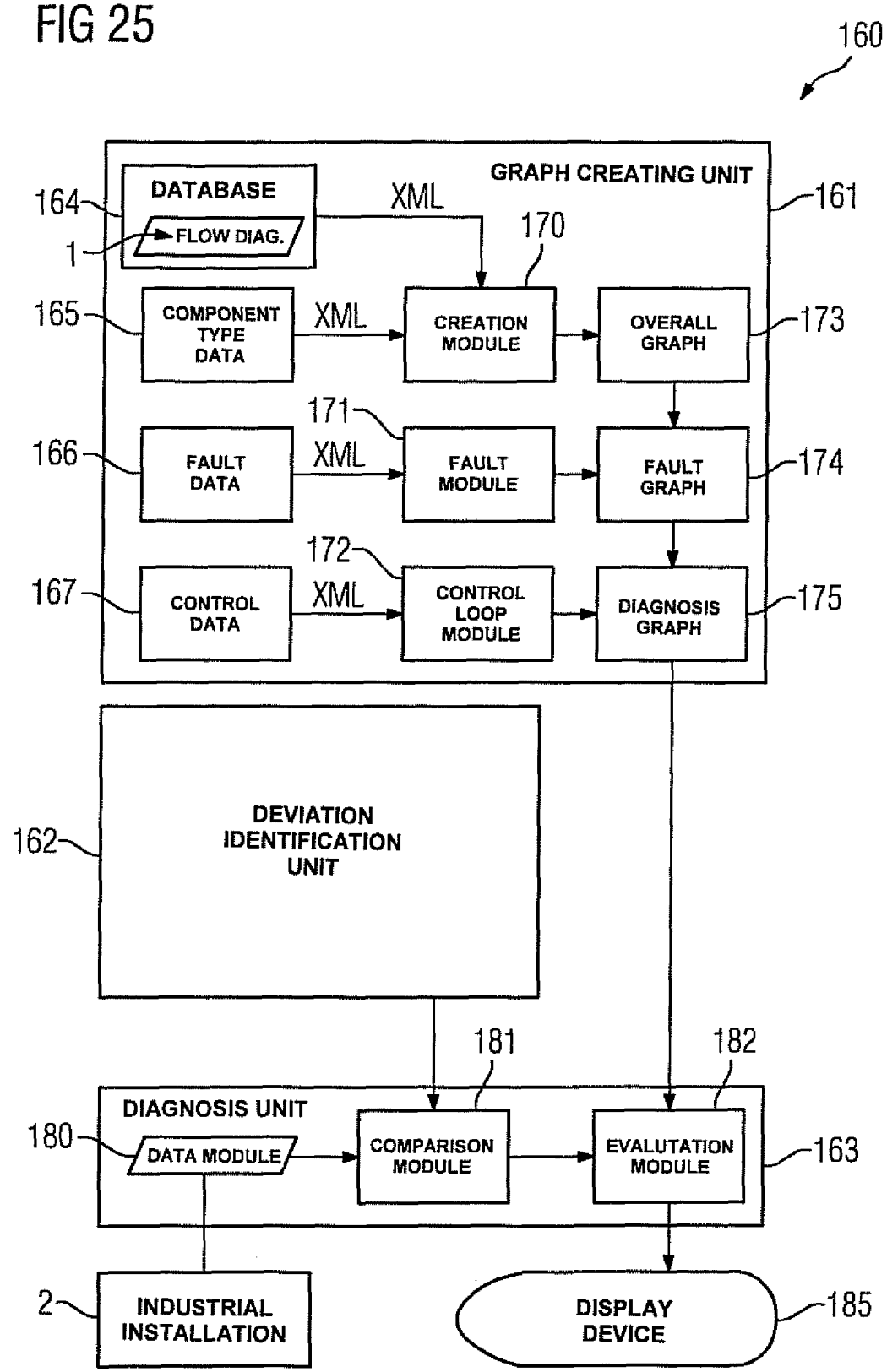
FIG. 25 is a schematic block diagram of a device for supporting the fault diagnosis of an industrial installation in accordance with the invention.

FIG. 25 shows a device 160 for performing a diagnosis method for supporting fault diagnosis of the above installation 2.

The device 160 comprises a graph creating unit 161, a deviation identification unit 162 and a diagnosis unit 163.

The graph creating unit 161 comprises a database 164, in which installation data concerning the industrial installation 2 are stored in electronically utilizable form, here in the form of XML files.

The installation data comprise the piping and instrumentation flow diagram 1 (FIG. 1) of the industrial installation 2, component type data 165, fault data 166 and control data 167.

The piping and instrumentation flow diagram 1 comprises, as already explained in detail above, information about what installation components 3 the installation 2 comprises, the component types to which they are to be assigned, and how and in what flow direction 6 the individual installation components 3 are interconnected with one another.

The flow diagram 1 additionally stipulates in what different modes of operation or operation states the associated industrial installation 2 can be operated.

A (non-specific) directed weighted component graph in accordance with one of FIG. 3, 5, 7-9, 11, 13, 15, 17 or 18 is in each case stored as component type data 165 for each of the component types mentioned above. These component graphs presented as building blocks were determined beforehand from experiments or mathematical models. The component graphs are stored—as described above—as adjacency matrices and associated process parameter vectors.

The fault data 166 comprise information about how different fault types affect individual installation components 3 or the assigned process parameters 7 thereof. Here, too, a directed weighted fault graph or an assigned adjacency matrix is stored for each fault type. The fault graphs, too, were determined beforehand by experiments or mathematical models.

The control data 167 comprise information about what control loops are integrated in the industrial installation 2 to consider and how they take effect. This information is present in tabular form.

Figure 22:
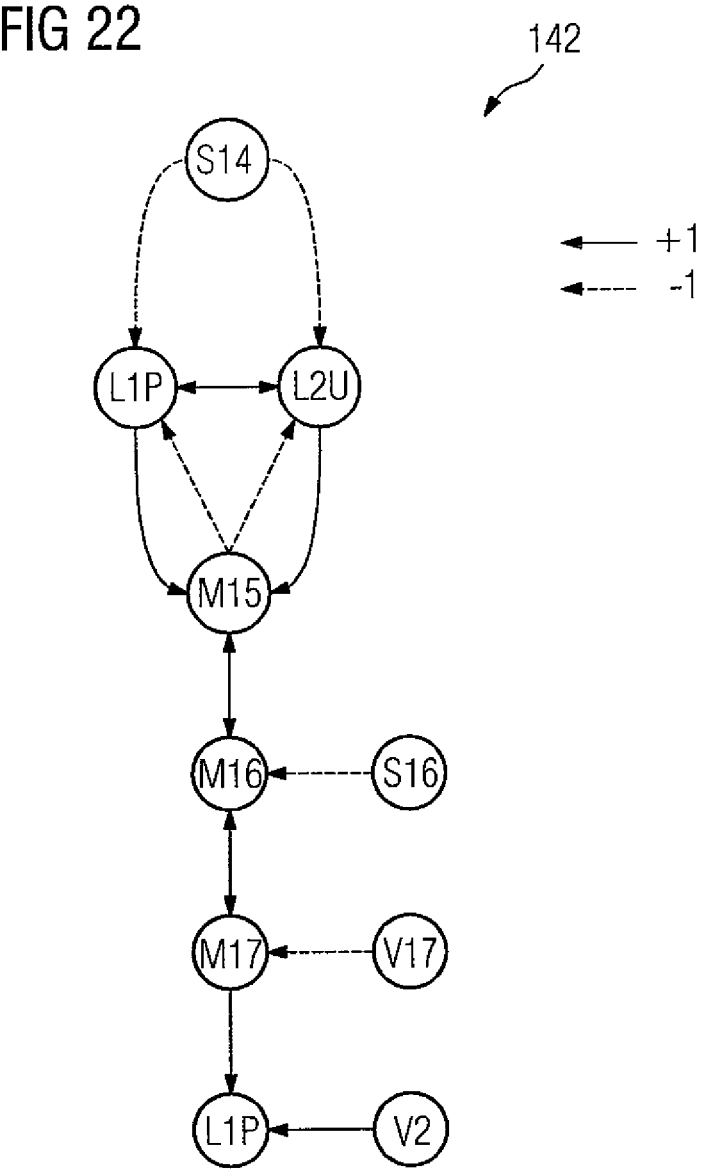
FIG. 22 is a schematic illustration of a further directed weighted "valve overall graph" of the installation, which graph is assigned to a second operating state in accordance with the invention.

The graph creating unit 161 additionally comprises a creation module 170, which automatically creates a system of directed weighted overall graphs of the installation 2 based on the piping and instrumentation flow diagram 1 and based on the component type data 165. Here, the system comprises, if appropriate, in each case a valve overall graph and a pump overall graph for each operating state (FIG. 20 to FIG. 22). For this purpose, the creation module 170 automatically performed the creating method described above. In this case, the creation module 170 is a software module, i.e., in which the creating method described above is implemented by programming and which is installed in an executable fashion on a computer.

Furthermore, the graph creating unit 161 comprises a fault module 171, which—as described above—inserts the stored fault data in the form of fault cause nodes into the overall graph or graphs of the industrial installation 2. Moreover, the graph creating unit 161 comprises a control loop module 172, which—as described above—inserts the information of the control loop into the overall graph or graphs of the installation 2 by back-calculation.

Consequently, the graph creating unit 161 creates at least one overall graph 173 that is combined with the fault types to form a fault graph 174 and additionally with the control loop information to form an evaluatable diagnosis graph 175.

In the deviation identification unit 162, criteria are stored for all process parameters 7 of the industrial installation 2, upon the meeting of which criteria a deviation of the respective process parameter from a setpoint state is identified as faulty. These criteria define, for example, a validity range surrounding the setpoint state. In the embodiment illustrated here, a fixedly predefined alarm threshold is set for each process parameter 7, where an under or overshoot of the respective alarm threshold is assessed as a deviation from the validity range. An alternative embodiment provides for historical process data to be consulted, on the basis of which self organizing maps ("SOM") are learnt, as a result of which critical deviations can be identified in a self-learning fashion and thereby flexibly.

The diagnosis unit 163 comprises a process data module 180, a comparison module 181 and an evaluation module 182. The process data module 180 is interconnected at least in terms of signaling with the industrial installation 2 or the observable installation components 3 thereof and detects continuously metrologically detectable process parameters 7 of the associated installation components 3 of the industrial installation 2. The process data module 2 feeds the detected process parameters 7 to the comparison module 181. The comparison module 181 accesses the respectively predefined limit values of the deviation identification unit 162 and determines in each case for all detected process data 7 whether the predefined limit values deviate from their respective validity range. In the case of an identified deviation, the comparison module 181 outputs a diagnosis command to the evaluation module 182. The evaluation module 182 thereupon accesses the created diagnosis graphs 175 of the graph creating unit 164 and evaluates the diagnosis graphs 175 with the aid of the ESFA method. In this case, substantially all deviations determined by the comparison module 181 are regarded as symptoms. Proceeding from the symptoms, by tracing back the edges of the diagnosis graph 175, those fault causes that have the same symptoms are sought, such that these fault causes are determined as possible fault causes.

Finally, the evaluation module 182 displays the possible fault causes determined on a display device 185. Here, the display device 185 is, for example, an independent monitor. As an alternative thereto, however, it is also conceivable for the display device 185 provided to be a display area in the context of a control diagram in a control room of the industrial installation 2.

In this case, the display can be effected firstly by a text representation, for example:

"Deviations from the normal state discovered. Possible fault causes are (i) partial blockage pipe M10/M11; (ii) partial blockage actuating valve VT.KVL-U210; and (iii) actuating valve VT.KVL-U210 closed too far".

However, it is also possible for the installation components that come into question for the possible fault causes to be displayed graphically, i.e., in the context of a control diagram in a control room of the industrial installation.

The above-described contemplated embodiments of the method in accordance with the invention have been described in specific application to two exemplary installations 2 and 2', merely for illustrative purposes. It goes without saying, however, that disclosed embodiments of the method are furthermore also applicable to any other installations. If such an installation contains components which do not correspond to one of the component types introduced above, the missing component types should be supplemented analogously.

Furthermore, the invention is not restricted to the above-described exemplary embodiments of the method and of the associated device. Rather, further embodiment variants of the invention can be derived by the person skilled in the art on the basis of the above description.

While there have been shown and described and pointed out fundamental novel features of the invention as applied to a preferred embodiment thereof, it will be understood that various omissions and substitutions and changes in the form and details of the methods and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for supporting fault diagnosis of an industrial installation having a plurality of installation components connected via a pipeline system, each installation component of the plurality of installation components being assignable to one of a plurality of abstract component types, the method comprising:
   assigning, in a processor of a computer, a weighted directed component graph to each of the plurality of abstract component types;
   processing, component by component, a piping and instrumentation flow diagram of the industrial installation proceeding from a start point along the pipeline system;
   accessing the weighted directed component graph of an installation component assigned according to a component type;
   joining together individual component graphs which are each predefined as an assigned component adjacency matrix to form a system of weighted directed overall graphs of the industrial installation; and
   assigning each node of the weighted directed overall graphs of the industrial installation to the plurality of individual installation components.

2. The method as claimed in claim 1, wherein uniquely designated and specified process parameters are assigned to all installation components;
   wherein an empty overall adjacency matrix of at least one overall graph of the industrial installation is created in accordance with a number of considered process parameters of the plurality of installation components;
   wherein proceeding from the start point, component by component, each installation components of the plurality of installation components with the aid of the uniquely designated and specified process parameters assigned to the installation components, an associated component adjacency matrix is specified in relation to the specified process parameters of a respective component;
   wherein each element of the associated component adjacency matrix is transferred according to the specification to an appropriate corresponding position into a respective overall adjacency matrix; and
   wherein installation components of the industrial installation are progressively accessed along the pipeline system until an entry in the respective overall adjacency matrix has been made for all of the plurality of installation components.

3. The method as claimed in claim 1, wherein a container or a pipeline branching of the piping and instrumentation flow diagram is chosen as the start point.

4. The method as claimed in claim 2, wherein a container or a pipeline branching of the piping and instrumentation flow diagram is chosen as the start point.

5. The method as claimed in claim 1, wherein the pipeline system is followed in the flow direction.

6. The method as claimed in claim 1, wherein effects of fault causes are stored, and wherein each fault cause as an additional fault cause node and the effects thereof as at least one weighted edge are added to at least one overall graph to form a directed weighted diagnosis graph.

7. The method as claimed in claim 6, wherein the diagnosis graph is evaluated upon a deviation of an observable process parameter of an installation component of the plurality of installation components from a normal state using an Extended Symptom-Fault Association (ESFA) method to determine possible fault causes.

8. The method as claimed in claim 7, wherein the deviation is identified by comparison with historical data of the industrial installation.

9. The method as claimed in claim 7, wherein the deviation is identified aided by fixedly predefined alarm thresholds.

10. The method as claimed in claim 8, wherein the deviation is identified aided by fixedly predefined alarm thresholds.

11. The method as claimed in claim 1, wherein the piping and instrumentation flow diagram is subdivided into individual subsystems; and wherein for each subsystem a subsystem graph is initially created as an overall graph or part thereof.

12. The method as claimed in claim 11, wherein the individual subsystems are chosen such that the plurality of installation components of respective subsystems do not mutually influence one another, and wherein a respective container is used as a boundary component between two subsystems.

13. The method as claimed in claim 1, wherein the piping and instrumentation flow diagram is subdivided into individual operating state groups;
  wherein each operating state group comprises those installation components of the plurality of installation components which are involved in an assigned operating state; and
  wherein for each individual operating state group a dedicated operating state graph is created as an overall graph, and the dedicated operating state graph comprises as nodes only process parameters of each of the plurality of installation components involved in a respective operating state.

14. The method as claimed in claim 1, wherein two passes are made through the piping and instrumentation flow diagram to decouple pumps and valves, wherein, in a first pass, all installation components of the plurality of installation components, except pumps, are processed to create a valve overall graph; and wherein, in a second pass, all installation components of the plurality of installation components, except valves are processed to create a pump overall graph.

15. The method as claimed in claim 1, wherein a hypothetical value of a process parameter which the process parameter would have before an intervention of a closed-loop control is deduced based on an actual value of a process parameter controlled by a manipulated variable and based on an actual value of the manipulated variable.

16. The method as claimed in claim 2, wherein the uniquely designated and specified process parameters are numbered.

17. A device for supporting fault diagnosis of an industrial installation comprising:
  a database in which a piping and instrumentation flow diagram and component graphs associated with the installation components are stored; and
  a processor including memory and a creation module, the creation module causing the processor to:
    assign a weighted directed component graph to each of the plurality of abstract component types;
    process, component by component, a piping and instrumentation flow diagram of the industrial installation proceeding from a start point along the pipeline system;
    access the weighted directed component graph of an installation component assigned according to a component type;
    joining together individual component graphs to form a system of weighted directed overall graphs of the industrial installation, each of the individual component graphs being predefined as an assigned component adjacency matrix; and
    assign each node of the weighted directed overall graphs of the industrial installation to the plurality of individual installation components.

18. The device as claimed in claim 17, further comprising:
a diagnosis unit configured to find fault causes.

* * * * *